Nov. 24, 1925.

S. TOTH

SPEEDOMETER

Filed April 17, 1922

1,562,666

Inventor
Steven Toth
by
Atty.

Patented Nov. 24, 1925.

1,562,666

UNITED STATES PATENT OFFICE.

STEVEN TOTH, OF LOS ANGELES, CALIFORNIA.

SPEEDOMETER.

Application filed April 17, 1922. Serial No. 554,254.

*To all whom it may concern:*

Be it known that I, STEVEN TOTH, a citizen of the United States, residing at Los Angeles, in the county of Los Angeles and State of California, have invented new and useful Improvements in Speedometers, of which the following is a specification.

My invention relates to speedometers commonly used in connection with motor propelled vehicles for indicating the speed at which the vehicle is running, and more particularly pertains to means for engaging the indicating dial of the speedometer and holding the same from returning to zero, in order to indicate the actual speed at which the vehicle was moving when brought to a sudden stop by an application of the brakes or by colliding with some object.

When collisions occur in the driving of automobiles, disputes often arise between the colliding parties as well as with the traffic authorities as to the speed the vehicle was moving when the accident transpired. It is the main object of my invention to provide a device which will register the speed at which the vehicle upon which it is installed was moving when brought to a sudden stop, and thereby present satisfactory evidence to the parties concerned as to who was at fault.

Another object of my invention is to provide a simple mechanism for accomplishing the above recited objects which may be readily incorporated with the mechanism of speedometers now in general use.

A further object is to provide means for automatically releasing the indicating dial when the vehicle is again started and allowing the speedometer to again perform its usual function.

Other objects of my invention will be more fully disclosed in the following description and are embodied in the accompanying drawings, in which.

Figure 1:
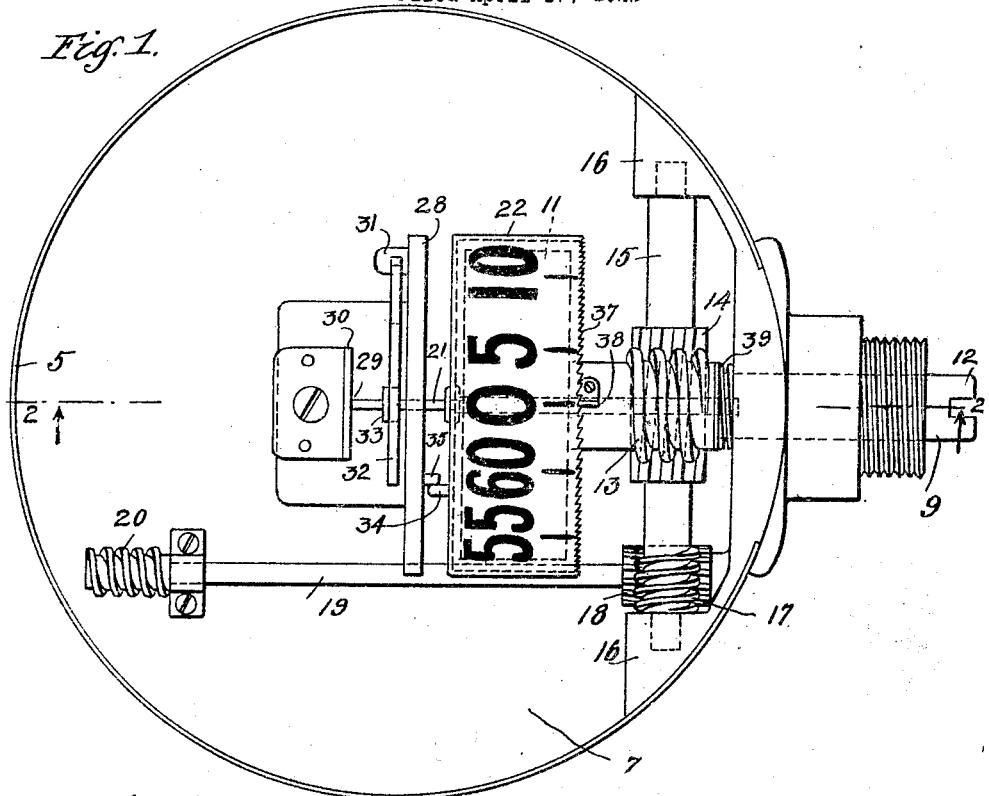
Fig. 1 is a plan view, with the cover removed, of a magnetically operated speedometer of a well known type, showing my invention applied thereto, the mechanism being stationary.

In carrying out my invention I have illustrated a magnetically operated speedometer of a well known construction, in which 5 represents the casing, 6 the cover thereof, 7 a base plate mounted therein provided with the bearing 8 in which is journaled the shaft 9 provided at its inner end with the rotor 10 upon which the magnet 11 is mounted, and at its opposite end 12, with means whereby the usual flexible shaft (not shown) which is adapted to lead to the vehicle wheel and to be driven thereby in the usual manner may be attached.

The shaft 9 is provided with a worm 13 adapted to engage with a worm wheel 14 mounted on a shaft 15 journaled in bearings 16 secured to the base plate 7, and secured to shaft 15 is a worm 17 adapted to engage with a worm wheel 18 secured to a shaft 19 which is provided on its opposite end with a worm 20 adapted to drive other mechanism, which is not shown as it forms no specific part of this invention.

Secured to a shaft 21 is the usual indicating dial drum 22 adapted to surround the magnet 11 and to be controlled by the magnetic forces set up thereby, upon various speeds of rotation thereof, to indicate the speed the vehicle is being driven.

The shaft 21 passes through a centrally disposed bore 23 in the shaft 9 and its end 24 is formed into a needle point which is journaled in a slidable block 25 mounted in said bore, a spring 26 being interposed between said block and the end wall of the bore. The opposite end of the shaft 21 passes through and is loosely journaled in a bore 27 formed in a plate 28 secured to the base plate 7, and the extreme end 24 of said shaft rests against a thrust plate 30 which is also secured to the base plate 7. The plate 28 is provided with a lug 31 to which one end of a coil spring 32 is secured, the other end of said spring being secured to a hub 33 secured to the shaft 21. The dial drum 22 is provided with a pin 34 adapted to be normally held against a stop pin 35 secured to plate 28 by means of the spring 32 when the speedometer is inoperative to expose the zero numeral through the aperture 36 formed in the cover 6.

The dial drum 22 is provided on its peripheral edge with a plurality of teeth 37 adapted to be engaged, as will hereafter be explained, by the knife edged blade 38 which is secured to the shaft 9. A spring 39 surrounds the shaft 9 and is interposed between a shoulder formed thereon and a shoulder in the bearing of said shaft, as clearly shown in Fig. 2 of the drawings.

Figure 2:
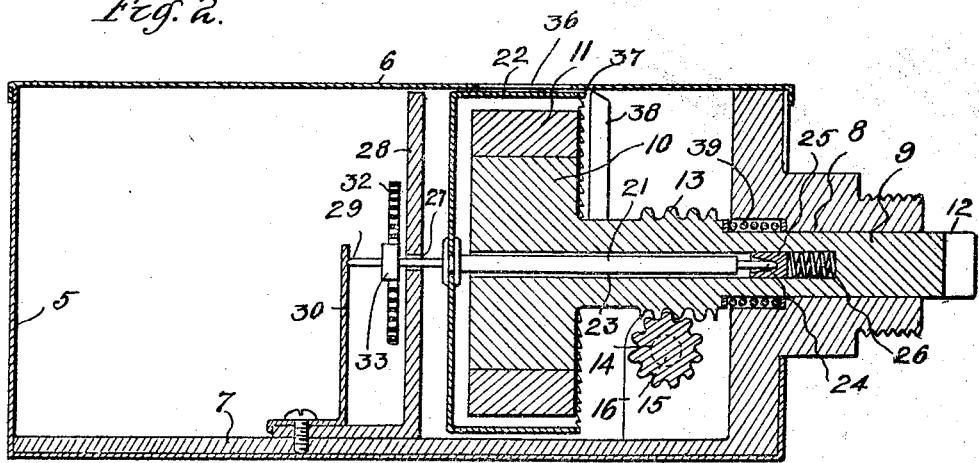
Fig. 2 is a sectional view of the same taken on the line 2—2 of Fig. 1, the mechanism rotating.
Figure 3:
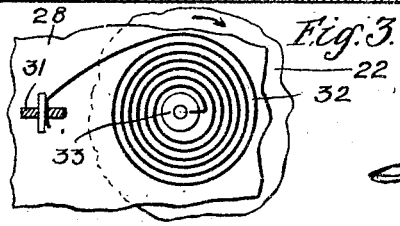
Fig. 3 is a fragmental view showing the dial control spring.

In Fig. 1 of the drawings the mechanism is shown in a passive state, that is, the speedometer is inoperative, and in Fig. 2 the mechanism is shown in an active state, the speedometer operating to perform its usual function.

The shaft 9 is adapted to have a slight longitudinal movement in the bearing 8, the spring 39 tending to thrust the shaft inwardly in a position indicated in Fig. 1 to hold the blade or pawl 38 in engagement with the teeth 37 and thereby lock the dial drum 22 to the shaft 9, the lost motion between the teeth of the various worms and worm gears permitting of this longitudinal movement of the shaft.

When the shaft 9 is started to rotate the thrust caused by the resistance of the gearing and mechanism which is operated thereby is sufficient to overcome the resistance of the spring 39 and as a consequence the shaft 9 will be thrust outwardly as shown in Fig. 2, thereby releasing the blade 38 from engagement with the dial drum, thus permitting said drum to perform its function of registering the speed at which the vehicle is running.

When the vehicle is suddenly stopped the shaft 9 becomes instantly inactive, the thrust of the mechanism driven thereby is released therefrom and the spring 39 at once acts to throw the blade 38 into engagement with the dial drum, thus locking said drum to the inactive shaft before the return spring 32 can act to return it to indicate zero. By this action it will be evident that the numeral on the dial drum will be displayed to indicate the speed the vehicle was running when brought to a sudden stop and will continue to be exposed until the vehicle is again started.

During the above recited operations it will be evident that the dial 22 will be held from sliding with respect to the shaft 9 by means of the spring pressed bearing block 25.

Although I have illustrated and described only one specific mechanism for accomplishing the desired result, it will be obvious that the broad idea of my invention may be accomplished by other constructions and may be applied to speedometers of other types.

What I claim is:

1. In a speedometer, a rotary speed indicating dial, a rotatable and reciprocatory mounted shaft, means associated with said dial and shaft for rotating said dial to indicate the speed at which said shaft is revolving, and means for locking said dial and shaft together and unlocking them from each other upon a reciprocation of said shaft.

2. In a speedometer, a speed indicating dial, a rotatably mounted shaft adapted to be automatically reciprocated in one direction when not rotating and in an opposite direction when rotating, means associated with said dial and shaft for actuating said dial to indicate the speed at which said shaft is revolving, and a clutch mechanism actuated by the reciprocating movement of said shaft adapted to engage with said dial when said shaft is not revolving and to become disengaged from said dial when said shaft starts to revolve.

In witness that I claim the foregoing I have hereunto subscribed my name this 28th day of March, 1922.

STEVEN TOTH.